Figure 1:
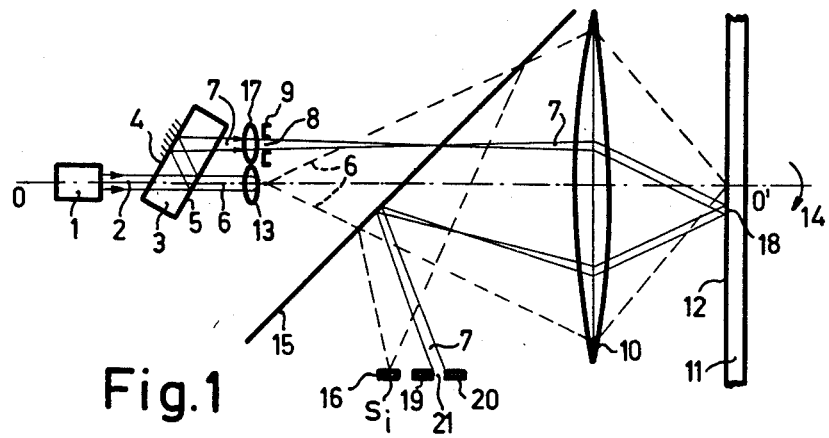

United States Patent [19]
Gerritsen et al.

[11] 3,969,575
[45] July 13, 1976

[54] OPTO-ELECTRONIC FOCUS DETECTION SYSTEM

[75] Inventors: Gerrit Berend Gerritsen; Gerard Eduard van Rosmalen, both of Eindhoven, Netherlands

[73] Assignee: U.S. Philips Corporation, New York, N.Y.

[22] Filed: Dec. 6, 1974

[21] Appl. No.: 530,167

[30] Foreign Application Priority Data
Aug. 8, 1974 Netherlands.................. 7410642

[52] U.S. Cl................. 178/6.6 R; 178/6.6 DD; 179/100.3 V; 250/201; 356/122; 356/125
[51] Int. Cl.².................. G11B 7/12; G01V 1/04
[58] Field of Search.................. 356/122–123, 356/125–126, 120, 172; 350/194, 197; 250/201; 179/100.3 V; 178/6.6 R

[56] References Cited
UNITED STATES PATENTS

| | | | |
|---|---|---|---|
| 2,550,685 | 5/1951 | Garutso | 350/197 |
| 3,012,469 | 12/1961 | Clayborne | 356/172 |
| 3,876,841 | 4/1975 | Kramer et al. | 250/201 |

*Primary Examiner*—John K. Corbin
*Assistant Examiner*—Wm. H. Punter
*Attorney, Agent, or Firm*—Frank R. Trifari; Simon L. Cohen

[57] ABSTRACT

In an opto-electronic focus detection system for determining a deviation between the plane of focussing of an objective and a radiation-reflecting surface the path of a focussing beam which is reflected by said surface includes an assembly of two radiation-sensitive detection elements. The difference in the output signals of said elements is proportional to said deviation. By disposing a lenslike element of which only the outer zone has a lens action before the detection elements, the measuring range can be extended while maintaining the sensitivity for small deviations.

6 Claims, 9 Drawing Figures

OPTO-ELECTRONIC FOCUS DETECTION SYSTEM

The invention relates to an opto-electronic focus detection system for use in an apparatus for writing information in an information surface of a record carrier body as an optically readable radiation reflecting structure, or in an apparatus for reading information contained in an information surface of a record carrier as an optically readable radiation reflecting structure, which system is provided with a radiation source which emits a narrow focussing beam, which beam passes eccentrically through an objective of the write apparatus or the read apparatus respectively, and furthermore with two radiation-sensitive detection elements for intercepting the focussing beam which is reflected by the information surface and which passes the objective for a second time.

In the present description a focus-detection system is to be understood to mean a system for determining a deviation between the desired and the actual position of the plane in which an imaging beam is focussed. A focussing beam is to be understood to mean an auxiliary beam of radiation which is employed for the detection of said deviation. A record carrier body is to be understood to mean a carrier body provided with a radiation-sensitive layer in which an information structure can be written. A record carrier is a record carrier body provided with information. In the case of the record carrier body the information surface is the surface of the radiation sensitive layer, and in the case of the record carrier the surface of the information structure.

An opto-electronic focussing detection system as described hereinbefore has already been proposed, for use in a read apparatus, in the applicant's previous non-published Netherlands patent application No. 7,305,517. In the previously proposed apparatus the detection elements take the form of photo-diodes. The outputs of said diodes are connected to an electronic circuit in which the diode signals are processed into a control signal for correcting the focussing of the objective, for example by moving said objective.

The pull-in range, i.e. the maximum deviation between the actual and the desired plane of focussing that can still be detected, is determined by the dimensions of the diodes. If an extensive pull-in range is desired large diodes would have to be used. However, large diodes have a high capacitance and as a result the focussing will be corrected less rapidly via the electronic circuit.

The object of the present invention is to provide an opto-electronic focus detection system which does not have said drawback and which both has a large pull-in range and a high sensitivity for small focussing errors. The system according to the invention is characterized in that in the path of the reflected focussing beam to the radiation-sensitive detection elements a lenslike element is disposed of which only the outer zone has a lens action, whilst the central part of said element does not affect the direction of the focussing beam. The use of the lenslike element ensures that even for substantial focussing errors the focussing beam always hits the detection elements. In the case of small focussing errors the focussing beam passes through the central part of the lenslike element, so that for these small errors the same sensitivity is attained as in the case that no lenslike element would be provided.

Figure 2:
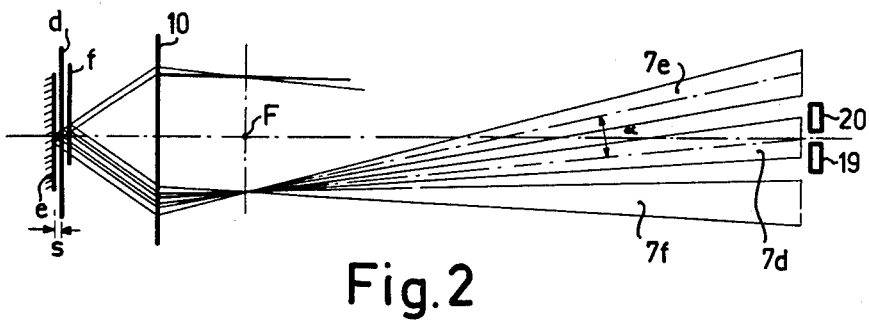
Figure 3:
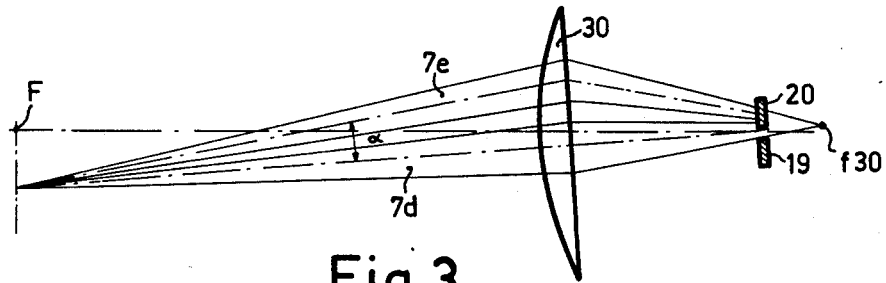
Figure 4:
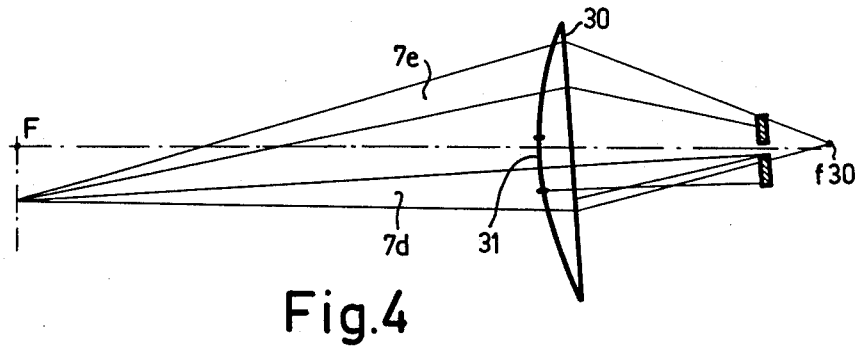
Figure 5:
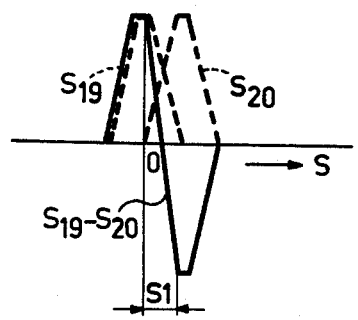
Figure 6:
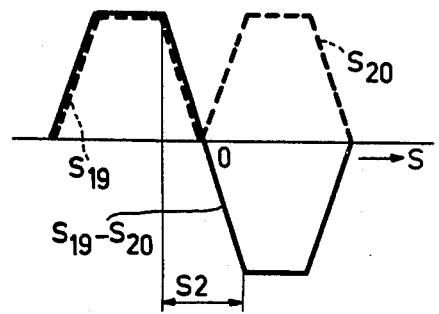
Figure 7:
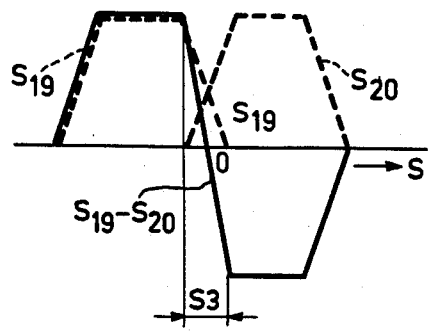
Figure 8:
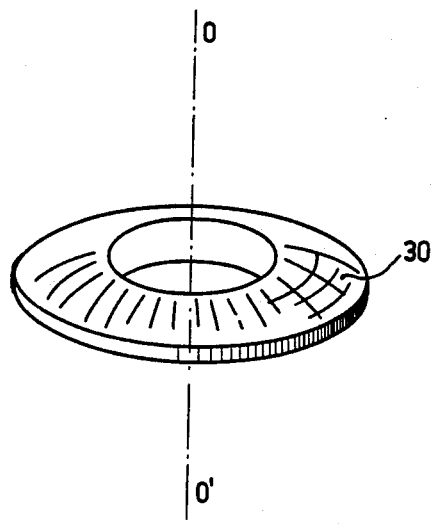
Figure 9:
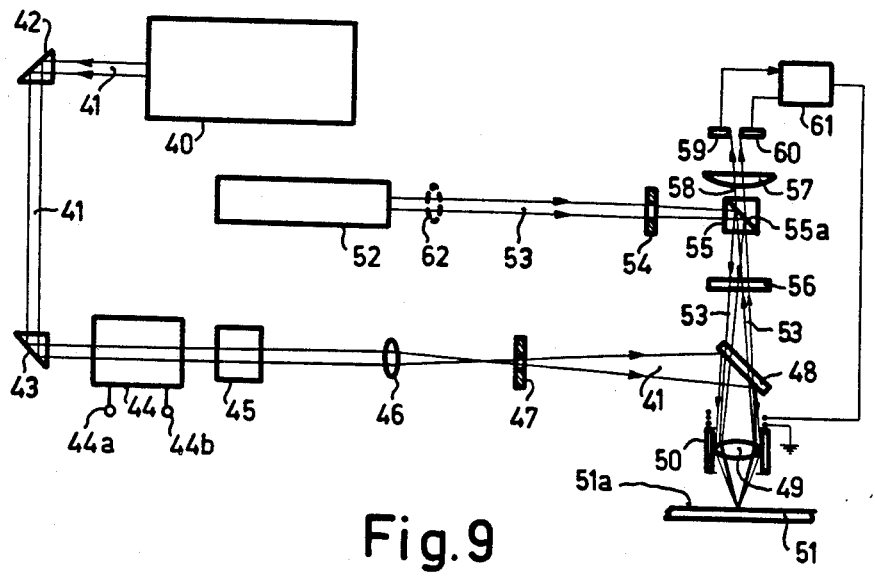

The invention will now be described with reference to the drawing, in which:

FIG. 1 shows a previously proposed read apparatus provided with an opto-electronic focussing detection system, FIG. 2 illustrates the operation of said system, FIGS. 3 and 4 show parts of an opto-electronic focussing detection system according to the invention, FIGS. 5, 6 and 7 show the electric signals, obtained with the systems of FIGS. 2, 3 and 4, as a function of the focussing error, FIG. 8 shows a lens element for use in a system according to the invention; and FIG. 9 shows an embodiment of a write apparatus provided with an opto-electronic focussing detection system according to the invention.

In the embodiment of a read apparatus shown in FIG. 1, the reference numeral 1 is a radiation source, for example a laser which emits a very narrow radiation beam 2. Said beam enters the beam splitter 3 via the face 4. The face 5 of said beam splitter is partly radiation transmitting, so that a part of the beam 2 is transmitted as read beam 6, whilst an other part of the beam 2 is reflected to the face 4.

The read beam 6 is focussed on the information surface 12 of a schematically shown record carrier 11 by an objective 10. The lens 13 ensures that the entire entrance pupil of the objective 10 is filled. The record carrier is for example a round disc which can be rotated as indicated by the arrow 14. The read beam 6 is then modulated in accordance with the information structure which successively appears in the beam cross-section. After reflection at the information surface 12 the modulated read beam passes the lens 10 for a second time and is then incident at for example a semitransparent mirror 15. The mirror reflects a part of the modulated read beam to the radiation-sensitive signal detector 16. From the electric output signal $S_i$ of the detector the original information can be recovered, for example picture and sound if a television program is stored on the record carrier.

When reading the record carrier whose optical information structure has very minute details, for example of the order of 1 $\mu$m, it is necessary that small variations in the position of the information surface can be detected, so as to enable the focussing of the objective to be corrected. For determining these variations use is made of the part of the radiation beam 2 which is reflected at the face 5 of the beam splitter 2. The part, after full reflection at the face 4 emerges from the beam splitter 2 as a second beam 7. The beam 7 functions as focussing beam and passes through an opening 8 of a diaphragm 9. The focussing beam enters the objective 10 at a comparatively great distance from the optical axis OO' of said objective. After refraction by the objective the focussing beam 7 hits the radiation reflecting information surface 12. For the focussing beam the information surface functions as a mirror which reflects said beam to the semi-transparent mirror 15. The mirror 15 directs the beam 7 to an assembly of two radiation-sensitive detection elements 19 and 20, which are separated by a very narrow slit 21.

The path of the focussing beam includes a lens 17. The field lens focusses the beam 7 in the focal plane of the objective 10, so that the focussing beam emerges from the objective as a parallel beam. Thus, a radiation spot 18 of constant size is formed at the information surface 12, so that the radiation spot in the plane of the detection elements 19 and 20 also has a constant size.

The detection elements 19 and 20 are arranged so that when the position of the information surface 12 is correct, as is shown in FIG. 1, the image of the opening 8, formed by the information surface and the objective, is symmetrical relative to the elements 19 and 20. The detection elements 19 and 20, which may be photodiodes, then receive the same radiation intensity. When the information surface 12 is moved to the left or the right, the distance between the location where the focussing beam enters the objective 10 and the optical axis will decrease and increase respectively. The focussing beam will then be refracted through a smaller or larger angle respectively. As a result of this, the photodiode 19 will receive more radiation or less radiation respectively than the photodiode 20. By comparing the electric signals supplied by the photodiodes 19 and 20 the magnitude and the direction of a deviation between the actual and the desired position of the information surface can be detected. In an electronic circuit, not shown, which is connected to the outputs of the photodiodes a focusing control signal can be produced in known manner.

To ensure rapid focusing control the photodiodes must be as small as possible. At increasing focussing errors the focussing beam will then rapidly fall beyond the photodiodes, as is illustrated in FIG. 2. This Figure only shows the radiation path of the focussing beam 7 from the information surface 12, the semi-transparent mirror 15 being omitted. In FIG. 2 three positions $d$, $e$ and $f$ of the information surface relative to the objective 10 are shown. These different positions result in different paths of the focussing beam, designated $7_d$, $7_e$ and $7_f$. Position $d$ is the desired position, and the focussing beam $7_d$ is symmetrically incident on the detection elements 19 and 20. The angle $\alpha$ between the chief ray of the focussing beam $7_d$ and the chief ray of a differently oriented focussing beam, for example beam $7_e$, is a function of the deviation $s$ between the desired and the actual position of the information surface 12. When the information surface is in position $e$ or $f$ the focussing beam $7_e$ or $7_f$ will fall beyond the range of the photodiodes.

FIG. 5 shows the variation of the electric signals $S_{19}$ and $S_{20}$ at the output terminals of the photodiodes 19 and 20, and the difference signal $S_{19}-S_{20}$ as a function of the deviation $s$ of the position of the information surface 12 from its desired position. The pull-in range is comparatively small, while the sensitivity which is inversely proportional to $s_1$ is comparatively high within said range.

The pull-in range can be increased by using an additional lens 30, as shown in FIG. 3. FIG. 3 only shows the path of the focussing beam from the focal plane F of the objective 10. When the focussing beam always reaches the lens 30, the radiation spot 18 (FIG. 1) is always imaged at the assembly of the photodiodes 19 and 20. By disposing the photodiodes at some distance from the focus $f_{30}$ of the lens 30, the focusing beam moves over the photodiodes 19 and 20 when the information surface is moved. As can be seen in FIG. 6, which shows the variation of the electric signals at the outputs of the photodiodes in the arrangement of FIG. 3, the pull-in range has been extended substantially. However, the sensitivity has decreased appreciably; $s_2$ is substantially greater than $s_1$ of FIG. 5.

According to the invention the sensitivity for small focussing errors can be increased while maintaining a large pull-in range, by cancelling the lens action of the central part of the lens 30. This can be achieved by grinding the central portions 31 of the curved lens faces plane, as is shown in FIG. 4. In the case of smaller deviations between the actual and the desired position of the information surface the focussing beam which is reflected by the information surface will fall onto the photodiodes without being refracted by the lens 30. Small deviations of the information surface will result in comparatively large excursions of the focussing beam over the photodiodes, so that the sensitivity for said small deviations is high. In the case of larger deviations between the actual and the desired position of the information surface, such as for example, occur during focussing just after a record carrier has been disposed in the read apparatus, the focussing beam will be directed at the photodiodes by the outer zone of the lens 30, so that there is always an indication about the direction in which the focusing is to be corrected. The focusing beam $7_e$ in FIG. 4 corresponds to said large deviation, while the focussing beam $7_g$ is partly incident on a plane and partly on a convex part of the lens surface.

FIG. 7, which represents the signals at the output terminals of the photodiodes in the arrangement of FIG. 4, shows that the arrangement of FIG. 4 combines the advantages of the arrangements of FIGS. 2 and 3. The pull-in range of the arrangement of FIG. 4 is large, while the sensitivity is satisfactory ($s_3$ is approximately equal to $s_1$).

The plano-convex lenses shown in FIGS. 3 and 4 are merely given by way of example. It is alternatively possible to employ a biconvex lens in the apparatus of FIG. 4. Instead of grinding plane faces 31 on a lens, it is alternatively possible to use an annular lens as shown in FIG. 8 for the lens 30.

The invention is explained with reference to an apparatus for reading a record carrier with a radiation-reflecting information surface. Said surface is employed as auxiliary imaging element in an imaging system in which a radiation source is imaged onto two detection elements. It will be evident that the invention is applicable in all cases where the position of a radiation reflecting surface relative to an imaging system is to be determined. For example, as opto-electronic system according to the invention may also be employed in an apparatus for writing information in a record carrier body for determining the position of the information surface relative to an objective with which a write spot of radiation is formed on the information surface. An embodiment of such an apparatus is shown in FIG. 9.

In this Figure the reference numeral 40 is a radiation source (for example a krypton laser) which supplies a radiation beam 41 of high intensity, the write beam. The beam 41 is successively reflected by the prisms 42 and 43 and subsequently passes through an electro-optic modulator 44. In said modulator the polarization of the incident linearly polarized beam is switched to either of two alternative states, in accordance with the signal to be recorded, which is applied to the terminals 44a and 44b. After the modulator 44 a polarizer is disposed, which depending on the state of polarizaton of the beam 41 transmits or does not transmit said beam. A wavelength-sensitive reflection element 48 reflects the pulses thus obtained to the radiation-sensitive surface 51a of a record carrier body 51. The radiation is focussed to a write spot of very small dimensions (for example of the order of 1 μm) by the objective 49. The lens 46 ensures that the entire pupil of the objective is filled. The element 47 is a shutter with which the beam 41 can be interrupted independently of the state of polarization. The radiation-sensitive layer of the record carrier body is exposed with a radiation pulses of which for example the sequence in time and the duration are determined by the signal at the terminals 44a and 44b. By moving the radiation sensitive layer in a plane perpendicular to the plane of drawing a track-shaped information structure can be written.

The objective 10 is suspended in a loudspeaker coil 50 so that it can move along with the radiation-sensitive layer 51a in a direction perpendicular to the plane of said layer. Deviations in the position of the layer 51a, which is assumed to be radiation-reflecting, relative to the desired position can be detected with the system to be described hereafter.

A second radiation source 52 (for example a helium-neon laser) emits a narrow radiation beam 53 with a different wavelength than the beam 41. The focussing beam traverses an opening in a diaphragm 54 and subsequently falls onto a polarizing dividing prism 55. The prism only reflects radiation with a specific orientation of the plane of polarization. The polarizing dividing plane 55a of the prism makes an angle with the chief ray of the focussing beam which deviates slightly from 45°, so that the beam passes the objective 10 at some distance from the optical axis. On its way to the objective the focussing beam passes a λ/4 plate 56 and the element 48 which is transparent for the wavelength of said beam. After reflection at the radiation sensitive surface 51a the focussing beam traverses the objective 10, the element 48 and the λ/4 plate 56 for a second time. Since it has passed the λ/4 plate 56 twice the plane of polarization of the reflected focussing beam is rotated through 90° relative to that of the beam which is emitted by the source 52, so that the reflected focussing beam is transmitted to the radiation-sensitive detection elements 59 and 60.

Before the detection elements 59 and 60, according to the invention, a lens 57 is disposed whose central portion 58 of a spherical surface has been ground plane. It is obvious that the lens has the same function as the lens 30 of FIGS. 3 and 4. The detection elements 59 and 60 are connected to an electronic circuit 61, in which a control signal for the displacement of the objective is derived from the detector signals. Said control signal is applied to the loudspeaker coil 50.

Furthermore, a field lens 62 may be included in the path of the focussing beam 53, which lens has the same function as the fields lens 17 in FIG. 1.

What is claimed is:

1. An opto-electronic focus-detection system for use in an apparatus for writing information in an information surface of a record carrier body as an optically readable radiation-reflecting structure with a writing beam, comprising an objective system for focussing said writing beam on said carrier body, a radiation source which emits a narrow focus detecting beam passing eccentrically through said objective of the write apparatus, two radiation-sensitive detection elements for intercepting the focus detecting beam which is reflected by the record carrier body and which passes the objective for a second time after said reflection, and a lens like element in the path of the reflected focus detecting beam to the radiation-sensitive detection elements, only the outer zone of said lens like element having a lens action, and the central part of said lens like element passing said focus detecting beam without affecting the direction of the focus detecting beam.

2. An opto-electronic system as claimed in claim 1, wherein the lenslike element comprises a single convex lens, the central parts of the convex lens faces being planar.

3. An opto-electronic system as claimed in claim 1, wherein the lenslike element comprises an annular lens.

4. An opto-electronic focus-detection system for use in an apparatus for reading information contained in an information surface of a record carrier as an optically readable radiation-reflecting structure with a reading beam, comprising an objective system for focussing said reading beam on said record carrier, a radiation source which emits a narrow focus detecting beam passing eccentrically through said objective of said record carrier reading apparatus, two radiation-sensitive detection elements for intercepting the focus detecting beam which is reflected by the record carrier and which passes the objective for a second time after said reflection, and a lens like element in the path of the reflected focussing beam to the radiation-sensitive detection elements, only the outer zone of said lens like element having a lens action, and the central part of said lens like element passing the focus detecting beam without affecting the direction of the focus detection beam.

5. An opto-electronic system as claimed in claim 4, wherein the lens like element comprises a single convex lens, the central parts of the convex lens faces being planar.

6. An opto-electronic system as claimed in claim 4, wherein the lens like element comprises an annular lens.

* * * * *